(12) United States Patent
Weiss et al.

(10) Patent No.: US 10,714,930 B1
(45) Date of Patent: Jul. 14, 2020

(54) DIGITAL ELECTRICITY USING CARRIER WAVE CHANGE DETECTION

(71) Applicant: VoltServer, Inc., East Greenwich, RI (US)

(72) Inventors: Jeffrey Weiss, Lincoln, RI (US); Stephen S. Eaves, Charlestown, RI (US); Likhita Ravuri, Warwick, RI (US)

(73) Assignee: VoltServer, Inc., East Greenwich, RI (US)

( * ) Notice: Subject to any disclaimer, the term of this patent is extended or adjusted under 35 U.S.C. 154(b) by 0 days.

(21) Appl. No.: 16/295,196

(22) Filed: Mar. 7, 2019

Related U.S. Application Data

(60) Provisional application No. 62/640,734, filed on Mar. 9, 2018.

(51) Int. Cl.
*H02H 7/26* (2006.01)
*G05B 15/02* (2006.01)
*H02H 1/00* (2006.01)

(52) U.S. Cl.
CPC ............. *H02H 7/265* (2013.01); *G05B 15/02* (2013.01); *H02H 1/0007* (2013.01); *H02H 1/0092* (2013.01)

(58) Field of Classification Search
CPC .... H02H 7/265; H02H 1/0092; H02H 1/0007; G05B 15/022
See application file for complete search history.

(56) References Cited

U.S. PATENT DOCUMENTS

| | | | | | |
|---|---|---|---|---|---|
| 6,008,972 | A | * | 12/1999 | Pietrobon | .......... H03K 17/0822 361/100 |
| 6,687,104 | B2 | * | 2/2004 | Aiello | .................. H02H 7/0833 361/115 |
| 2005/0018371 | A1 | * | 1/2005 | Mladenik | ................. H02H 3/00 361/78 |
| 2009/0204268 | A1 | | 8/2009 | Eaves | |
| 2012/0075759 | A1 | | 3/2012 | Eaves | |
| 2013/0103220 | A1 | | 4/2013 | Eaves | |
| 2015/0207318 | A1 | | 7/2015 | Lowe et al. | |
| 2015/0215001 | A1 | | 7/2015 | Eaves | |
| 2016/0134331 | A1 | | 5/2016 | Eaves | |

(Continued)

*Primary Examiner* — Kidest Bahta
(74) *Attorney, Agent, or Firm* — Modern Times Legal; Robert J. Sayre (57) ABSTRACT

A power-distribution system can detect a transmission-line electrical fault, and the power source can be electrically isolated from the transmission line before a human or equipment is substantially harmed or damaged. A controller on the source side is responsive to one or more sensors that provide a signal indicative of the voltage across the transmitter side of the transmission line. A source-disconnect device operable by the controller electrically isolates the source from the transmission line. A signal-generator circuit is configured to superimpose a higher-wavelength carrier waveform on the source-output waveform on the transmission line. The controller determines the normal impedance of the transmission line from measurement and detects a transmission-line fault, as indicated by a change in carrier waveform reflections or energy content of the carrier waveform and generates a command to open the source-disconnect device upon detection of the fault.

8 Claims, 3 Drawing Sheets

(56) References Cited

U.S. PATENT DOCUMENTS

| | | |
|---|---|---|
| 2017/0214236 A1 | 7/2017 | Eaves |
| 2017/0229886 A1 | 8/2017 | Eaves |
| 2018/0080962 A1* | 3/2018 | Fletcher .............. G01R 19/165 |
| 2018/0313886 A1 | 11/2018 | Mlyniec et al. |

* cited by examiner

DIGITAL ELECTRICITY USING CARRIER WAVE CHANGE DETECTION

RELATED APPLICATION

This application claims the benefit of U.S. Provisional Application No. 62/640,734, filed 9 Mar. 2018, the entire content of which is incorporated herein by reference.

BACKGROUND

In a typical power-distribution application, power from a central source is distributed through branch circuits to a load device. The branch circuits are equipped with protection devices, such as circuit breakers or fuses. During an electrical fault, such as a short circuit, the protection devices detect an abnormally high level of current and disconnect or interrupt the source from the load before causing damage or fire to the distribution system.

The introduction of the ground fault interrupter (GFI) added electrocution protection to the distribution system by detecting an imbalance between phase currents in a particular branch circuit, indicating that current is flowing through an alternative ground path and possibly in the process of electrocuting an individual.

There are, however, significant shortcomings in traditional distribution protection methods. For example, a fire could still occur from a loose connection. In this case, the series resistance of a live connection increases and heats up to the point of igniting surrounding materials. Alternatively, at sufficiently high voltages, a conductive plasma may form across a small air gap.

The heat build-up from a series fault condition could occur at electrical currents well below the trip point of the branch circuit protection devices. In the case of GFI protection, the GFI circuit can only protect an individual that comes in contact with both a line conductor and a ground point, such as would be the case if an individual touched a live electric conductor with one hand and a sink faucet with the other hand. However, if the individual manages to touch both a live conductor and a return path (such as across the "hot" and neutral conductors of a home outlet) the GFI would not activate, and the person would receive a shock.

There are two primary fault modes to be detected. The first mode is an in-line or series fault where an abnormal resistance is put in series with the path between the source and load. The second fault mode is a cross-line or parallel fault, where, for example, a human or animal touches one or both exposed wires or contacts along the transmission line while it is transporting power.

The requirements for the maximum voltage, current and duration for human contact with an electrical distribution system delivering alternating-current (AC) or direct-current (DC) power are defined in the IEC 60479-1 standard.

SUMMARY

Power-distribution systems and methods for electrical fault detection are described herein, where various embodiments of the systems and methods may include some or all of the elements, features and steps described below.

A power-distribution system for regulating transfer of energy from a source on a transmitter side of a transmission line to a load on a receiver side of the transmission line is described herein. The system can detect a transmission-line electrical fault, and the power source can be electrically isolated from the transmission line before a human or equipment is substantially harmed or damaged. The system can include a controller on the source side of the power-distribution system that is responsive to one or more sensors that provide feedback to the controller, including providing at least a signal indicative of the voltage across the transmitter side of the transmission line. The system can also include a source-disconnect device operable by the controller, for electrically isolating the source from the transmission line. Further still, the system can include a signal-generator circuit configured to superimpose a carrier waveform with the source-output waveform on the transmission line, where the carrier waveform has a frequency that is substantially higher than the source-output waveform frequency. The controller includes a processor and computer-readable memory in communication with the processor, wherein the computer-readable memory stores software code to determine the normal impedance of the transmission line from measurement or by utilizing a preset held in the computer-readable memory, and for detecting a transmission-line fault, as indicated by a change in carrier waveform reflections or energy content of the carrier waveform because of a change in the normal impedance of the transmission line. The computer-readable memory further stores software code that generates a command to cause the controller to open the source-disconnect device upon detection of the fault on the transmission line.

Approaches described herein address safety concerns in power-distribution systems, as reviewed in U.S. Pat. No. 8,781,637 B2; the approaches described herein, however, use an entirely different method for detecting and protecting against fault conditions.

In particular, the system and methods described herein can superimpose a carrier wave with the source output waveform on a transmission line (where the carrier waveform frequency is substantially higher than the frequency of the source waveform frequency) and then monitor the carrier wave.

The system and methods described herein can monitor and control the transfer of energy and can thus offer additional safety over what can be provided even by the combination of a circuit breaker and a ground fault interrupter.

Systems and methods described herein relate to safety-protection devices for power-distribution systems—for example, power-distribution systems with electronic monitoring to detect and disconnect power in the event of an electrical fault or safety hazard, particularly where an individual has made contact with exposed conductors. These systems and methods are applicable to general power distribution, or more specifically to electric-vehicle charging, telecommunications or alternative-energy power systems.

In the accompanying drawings, like reference characters refer to the same or similar parts throughout the different views; and apostrophes are used to differentiate multiple instances of the same item or different embodiments of items sharing the same reference numeral. The drawings are not necessarily to scale; instead, an emphasis is placed upon illustrating particular principles in the exemplifications discussed below. For any drawings that include text (words, reference characters, and/or numbers), alternative versions of the drawings without the text are to be understood as being part of this disclosure; and formal replacement drawings without such text may be substituted therefor.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially (though not perfectly) pure, as practical and imperfect realities may apply; e.g., the potential presence of at least trace impurities (e.g., at less than 1 or 2%) can be understood as being within the scope of the description. Likewise, if a particular shape is referenced, the shape is intended to include imperfect variations from ideal shapes, e.g., due to manufacturing tolerances. Percentages or concentrations expressed herein can be in terms of weight or volume. Processes, procedures and phenomena described below can occur at ambient pressure (e.g., about 50-120 kPa—for example, about 90-110 kPa) and temperature (e.g., −20 to 50° C.—for example, about 10-35° C.) unless otherwise specified.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. The term, "about," means within ±10% of the value recited. In addition, where a range of values is provided, each subrange and each individual value between the upper and lower ends of the range is contemplated and therefore disclosed.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video or audio form) for assembly and/or modification by a customer to produce a finished product.

A power-distribution system (that can detect an unsafe fault condition where an individual or object has come in contact with the power conductors) regulates the transfer of power from a source to a load. Power is delivered across the conductors in a low-frequency AC or DC format, and a higher-frequency detection signal is modulated onto the same transmission line.

Due to the low impedance characteristics of power delivery, it is difficult to detect transient human or animal contact, which may have an impedance that is hundreds of times higher than that of the load resistance. Using filtering and the principal of "superposition", the higher-frequency detection signal is isolated from the low-frequency signal and may be used to detect high-impedance disturbances.

"Superposition" states that for all linear systems, the net response caused by two or more stimuli is the sum of the responses that would have been caused by each stimulus, individually. In methods described herein, the high-frequency "test" signal that is overlaid onto the power signal can be more than 13 octaves above the highest frequency component in the power signal, enabling basic line filters to provide isolation between the two.

When contact is made across the power conductors or when a connector becomes loose, a change in the measured reflection coefficient or energy content of the higher-frequency detection signal is observed. When a sufficient change is detected at the power transmitter, the power signal is rapidly disconnected, rendering the conductors safe to human or animal touch and/or preventing heating or fires due to arcing. The detection signal continues to be transmitted at regular intervals, and when the disturbance to the conductors has been removed, the restored reflection coefficient and or energy content is detected, and the power signal is optionally reactivated.

Figure 1:
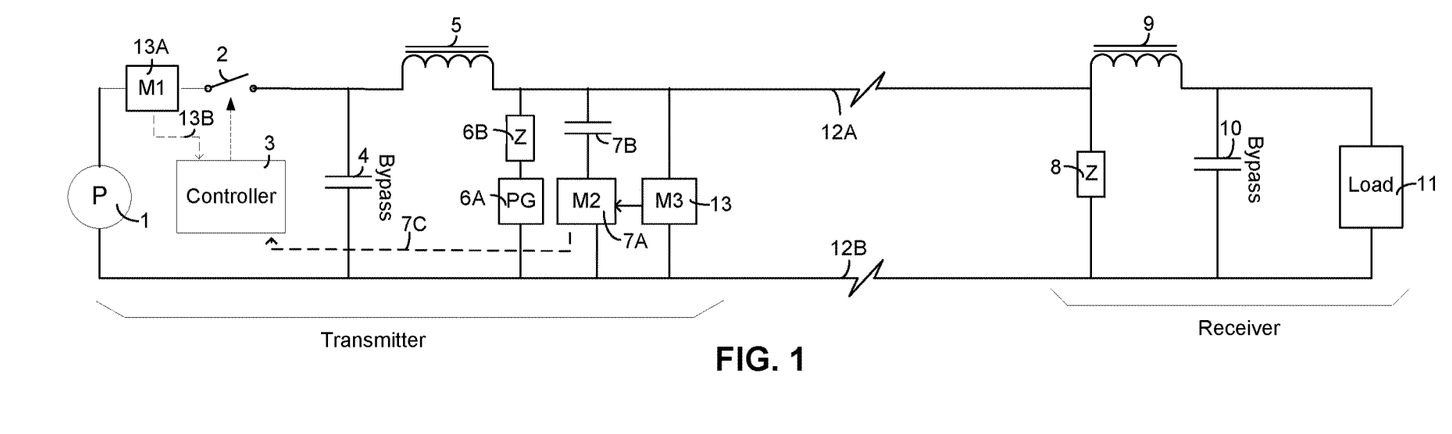
FIG. 1 is a block diagram of an embodiment of the safe power distribution system.

A high-level block diagram of an embodiment of the power-distribution system is shown in FIG. 1. FIG. 1 is meant to be illustrative of exemplifications of the system and does not include all components that can be included in the system.

The power-distribution system regulates the transfer of energy from a source (P) 1, to a load 11. Power is regulated by a switch 2. The source of the power (P) 1 can be either a DC-power source or an AC-power source at, e.g., 50 hertz or 60 hertz.

The inductor 5 prevents the ingress or egress of higher-frequency components into or out of the power source (P) 1. The inductor is permissive of the DC- or 50/60 Hz AC-power signal and contains sufficient magnetic material to not saturate at normal operating currents.

A carrier signal source (PG) 6A is coupled to the transmission line 12A/B following the inductor 5. The carrier signal includes a pulse train with frequency components at substantially higher frequencies than the power signal's DC-power frequency of 50 Hz or 60 Hz. The carrier signal is applied to the transmission line through an established impedance 6B, designed to approximately match the impedance of the carrier source to the expected characteristic impedance of the transmission line.

The carrier signal's initial amplitude and any reflections returned from the transmission line are measured by the M2 circuit 7A. The M2 circuit 7A includes signal-conditioning electronics and an analog-to-digital (A/D) converter for measuring voltage.

A capacitor 7B filters out the power signal from being measured; and, therefore, the M2 circuit 7A is principally sensitive to the carrier signal. Measured voltage samples are passed to the controller circuit 3 through control path 7C.

The bypass capacitor 4 is used to ensure a consistent impedance for the carrier signal at the transmitter end by shunting any carrier signal that leaks through the inductor to the 12B side of the transmission line.

Power in conjunction with the carrier signal is delivered to the receiving circuit through transmission wires 12A and 12B. Either of these wires may be grounded to earth but not both. Both wires may also be left floating with respect to earth ground.

At the receiving end of the transmission line 12A/B, there is an AC termination circuit (Z) 8 that serves as an impedance matching circuit to provide a controlled impedance for the higher-frequency carrier signal but which presents a very high impedance for the DC or low-frequency AC power signal. The power signal is passed mostly unimpeded by the inductor 9 to the load 11. Following the inductor 9, there is a bypass capacitor 10 to ensure a controlled AC impedance for the carrier signal, independent of the load 11 impedance.

In normal operation, the carrier signal from signal generator 6A is coupled through a controlled impedance 6B to the transmission lines and terminated at the receiver with the impedance circuit (Z) 8. The measurement circuit (M2) 7A detects the amplitude and shape of the carrier signal and any reflections that propagate on the transmission lines back to the transmitter. When a human or animal touches both transmission wires anywhere between the transmitter and the receiver on both wires 12A and 12B, the connection creates a detectable cross-circuit short across the line. In particular embodiments, the resistance of this short may be as high as two kiloohms and may still be detected. The presence of a cross-line short results in a measurable modification of the reflection coefficient as determined by the controller 3 utilizing A/D samples provided by the measurement circuit 7A.

If a transmission wire becomes loose from an inline connector and the resistance of the transmission path increases such that substantial heat or a fire may be created at the loose connection or a conductive plasma forms across an air gap, that fault will be detected as a change in the reflection coefficient or total energy content derived by the controller 3, making use of the samples provided by the measurement circuit 7A. In particular, the incremental resistance detected may be as low as 5 ohms.

A measurement unit (M1) 13A measures the current flowing from the power source (P) 1 towards the load 11. This information is passed to the controller 3 through the control path 13B. When the current exceeds a preset value, the controller instructs the switch 2 to open, thereby performing a normal circuit-breaker function. Depending upon the configuration, restoring current flow may require a manual operation, such as passing a command to the controller to restore the circuit; or the circuit may be automatically reconnected after a preset interval and only for a preset number of retries prior to manual intervention being required. The purpose of the circuit-breaker functionality is not to detect shorts or other impairments in the transmission line, but to detect faults in the load, itself. Impairments in the transmission line are more rapidly detected by the carrier signal and the detection mechanism previously described.

Another measurement unit (M3) 13 is used to measure the DC impedance of the transmission line 12A/B during calibration.

Figure 2:
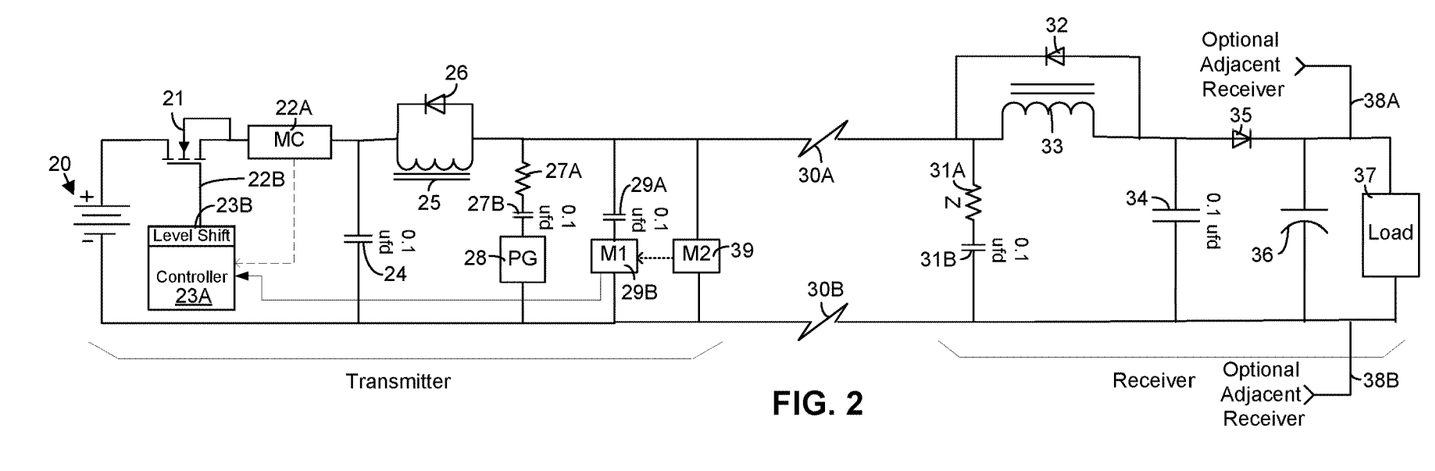
FIG. 2 is a more detailed block diagram of an embodiment of the power distribution system for delivery of DC Power.

FIG. 2 illustrates a circuit for passing power in a DC format to a remote load. The DC power source 20 can be any DC power source, for example a DC rectifier that obtains power from an AC Main. In some examples, the voltage supplied by DC power source 20 may be in the range of 100 volts to 400 volts. The negative side of the battery is connected to transmission line 30B and may optionally be connected to Earth Ground, as may be required by electrical codes.

A switch 21 enables power to flow towards the load 11. When the switching device 21 is a MOSFET device, as shown in FIG. 2, then a level shifter circuit 23B, as is well known in the field of switching power supply design, is used to boost the control voltage from the controller 23A to the proper voltages necessary to turn on and off the device. Given the low duty cycle of the switch 21 in this application, other types of switching devices, such as a mechanical relay, may be used.

Following the switch 21, a current sensor 22A is used to measure the current flow from the DC power source 20. Measurements are delivered to the controller across a link 22B. In the present example, the current sensor 22A is a hall effect magnetic sensor that provides isolation between the high side voltage of the power source 20 and the much lower operating voltage of the controller 23. Alternatively, the current sensor 22A can be a shunt resistor.

The DC current next flows through inductor 25. The purpose of this inductor 25 is to provide a very-low impedance path for the lower-frequency power from the DC source 20 while providing a high-impedance path to the high-frequency carrier signal.

A diode 26 is used to suppress the voltage spike that occurs when the switch 21 opens. The power stored inside the inductor 25 is dissipated when the switch 21 opens.

PG 28 is a programmable pulse generator under the control of the controller 23A. In the present example, the pulse generator 28 periodically generates a series of one microsecond pulses for use as the carrier signal. The carrier signal is coupled to transmission-line conductors 30A and 30B through impedance-matching components 27A and 27B. The impedance matching components 27A and 27B are designed to match the expected characteristic impedance of transmission line 30A and 30B for optimum power transfer, as is common practice among those skilled in the art of transmission-line power transfer.

In other embodiments, the carrier signal can be generated with a number of source circuits and waveforms with similar results using methods well known to those skilled in the art of analog electronics.

At the receiver in FIG. 2, a resistor 31A and a capacitor 31B form an impedance-matching circuit to provide AC termination impedance for the carrier signal. The termination impedance is chosen to roughly match the characteristic impedance of the transmission lines 30A and 30B, thereby minimizing transmission-line reflection and maximizing carrier power transfer.

A bypass capacitor 34 ensures that any carrier signal that leaks through the inductor 33 is terminated to the transmission line 30B so that a consistent reflection coefficient can be calculated independent of the impedance of the load 37. A capacitor 36 provides filtering for lower frequency AC currents drawn by the load 37. A diode 32 is coupled in parallel with the inductor 33.

The diode 35 is used to shunt any energy that is stored in the inductor 33 when the switch 21 disconnects. This shunting minimizes the time it takes for the transmission line conductors 30A and 30B to quiesce following the detection of a fault condition.

The diode 35 ensures power is delivered to the load 37 during normal operation but not from the load or any of its storage elements during a fault condition. This diode 35 also allows multiple receiver circuits (fed by conductive links 38A and 38B) to be operated in parallel and to load share into the same load 37. This feature may be used for redundancy and/or for incremental power delivery over what a single transmission circuit can support.

Returning to the transmitter side of FIG. 2, the measurement circuit (M1) 29B along with its adjacent capacitor 29A are used to measure the amplitude of the pulses delivered by the pulse generator 28, and the reflections that are received from perturbations of the transmission line's characteristic impedance or impedance mismatch. A bypass capacitor 24 is also provided in a branch between the transmission lines 30A and 30B.

Figure 3:
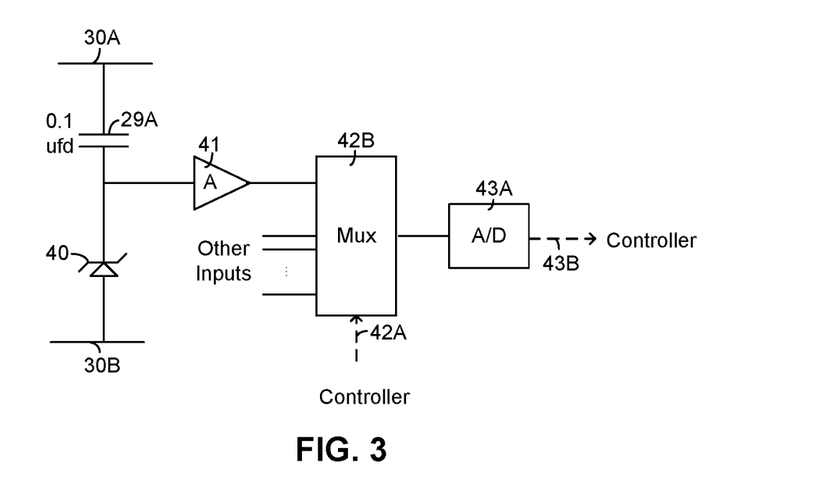
FIG. 3 depicts a measurement circuit, including means for coupling AC signals to an analog multiplexer, and an A/D converter for measuring voltages.

The embodiment shown in FIG. 3 shows an AC coupling capacitor 29A, a transient protection device 40, a fixed-gain amplifier 41, and an analog multiplexer 42B that allows multiple inputs to be sampled and passed to an analog-to-digital (A/D) converter 43A. The amplifier 41 normalizes the output of the AC signal from the AC coupling capacitor 29A to the full input range of the A/D converter 43A.

As shown in FIG. 3, control signal 42A is sent from the controller 23A (shown in FIG. 2) to select the appropriate channel from multiplexer 42B, one channel being a signal representative of the voltage across the transmission lines 30A and 30B.

Signal 43B is the analog output signal from the signal-conditioning electronics, shown in FIG. 3, and is sent to the controller 23A and represents the signal-conditioned voltage across lines 30A and 30B.

Also in FIG. 2, the resistance-measurement circuit (M2) 39 is a circuit for measuring the DC resistance of the transmission line 30A and 30B during the optional calibration phase and when the power signal is disconnected. This circuit is shown in greater detail in FIG. 4.

Figure 4:
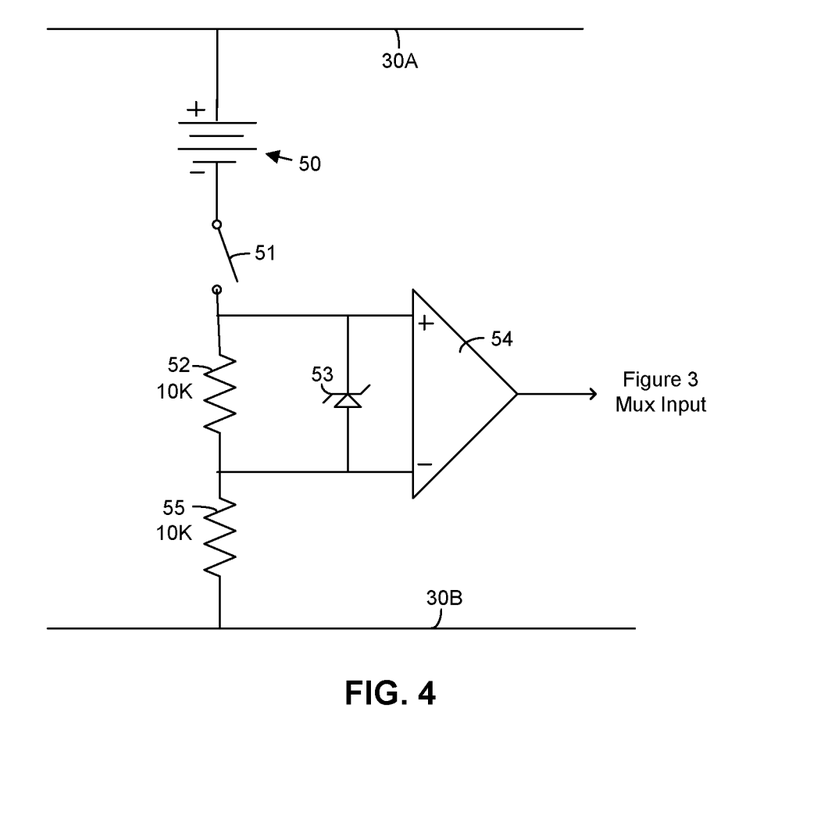
FIG. 4 is an input circuit to the measurement circuit in FIG. 3. This circuit measures the DC resistance of the transmission line during calibration.

As shown in FIG. 4, an isolated DC power source 50 provides a low-voltage DC signal through a relay 51, and then through resistors 52 and 55. Zener diode 53 provides protection for the inputs to the amplifier circuit 54. The output of the amplifier circuit 54 is selected to match the dynamic input range of the A/D converter 43A, shown in FIG. 3.

Operational Sequence:

Particular embodiments calculate an estimated value for ρ (Rho), which is the reflection coefficient for the transmission line, during an optional calibration phase and then periodically at one or more times per millisecond.

When Rho deviates sufficiently from a preset value—or from a derived value following the optional calibration phase, a cross-line short or series fault is declared, and power is immediately disconnected.

The reflection coefficient (Rho) is the ratio of the amplitude of the reflected wave and the amplitude of the incident wave. At a discontinuity in a transmission line, the reflection coefficient is the ratio of the electric field strength of the reflected wave to that of the incident wave, as shown below.

$$\rho = \frac{V_R}{V_I}$$

The reflection coefficient for a resistive termination or for a cross-line short anywhere along the transmission line may be modeled by the equation below. Here, $Z_0$ is the approximate characteristic impedance of the transmission line at frequencies above 100 kHz.

$$\rho = \frac{Z_{term} - Z_0}{Z_{term} + Z_0}$$

For many typical telecommunication twisted-pair cables, a typical value for $Z_0$ is approximately 100 Ohms. $Z_{term}$ is the impedance at the point of disturbance. For example, if a 1,000-ohm resistor is placed across the line, $Z_{term}$ will be 1,000 ohms in parallel with 100 ohms or 90.9 ohms. In this case, Rho will be −0.048 or −4.8%, and a small negative reflection will occur at the point of contact.

Similarly, if a series resistance is added to the transmission line, a small impedance perturbation will occur, causing a reflection. For example, if a 5-ohm resistor is added in series, then $Z_{term}$ equals 105 ohms, and Rho will equal 0.024 or 2.4%. Since Rho is positive, a small positive reflection will occur at the point of insertion.

In the present example, the carrier signal consists of 1 microsecond pulses at 2.2 volts peak. These pulses have a fundamental frequency of 1 mHz. The voltage level was chosen to remain within standard power limits for very-high-bit-rate digital subscriber line (VDSL) wire pairs used in traditional broadband networks. In this way, pairs carrying the carrier signal will be able to coexist with VDSL pairs in the same wire bundle. The 1-mHz fundamental frequency was chosen to enable the use of modest-sized, low-cost inductors for isolating the carrier signal from the power signal. In this example, the inductors have an inductance of 0.5 millihenry.

The fundamental frequency was also chosen such that, in most cases, the twisted-pair transmission line may be accurately modeled as a transmission line. On the other hand, the pulse was chosen to be long enough to allow a low-cost A/D converter to capture multiple amplitude samples along with its reflections.

The impedance of actual wire pairs will rarely be 100 ohms but will deviate considerably due to material and manufacturing variances. For optimal sensitivity and to ensure that small reflections can be considered, particular embodiments use an optional training phase where controller 23A makes initial estimates for the actual line impedance and ensures that an existing DC short or open condition does not exist before applying power to the transmission line. The training phase can be omitted in simpler embodiments at the expense of measurement sensitivity.

During normal operation, the controller 23A estimates how much the measured reflection coefficient deviates from the initial estimate; and, if sufficient deviance is estimated, the controller 23A declares a fault condition and triggers the switching device 21 to disconnect power from the transmission line 30A and 30B.

During a fault condition, the controller 23A probes the transmission line with a DC test voltage looking for a DC short, and with the AC test signal to validate that there is continuity through the receiver's termination impedance. When both are satisfactory, a new calibration sequence commences and power delivery resumes.

In addition to analyzing the reflection coefficient of the carrier wave, a general decrease in the energy content of the carrier wave is also used as an indicator of a cross-line fault. The output impedance of the carrier-wave generator 28 can be designed to be substantially higher than that of the power source 20. A decrease in the line-to-line impedance would result in an increase in the carrier-wave generator output current. Either a change in output current or a reduction in output voltage of the carrier-wave generator 28 as detected by the controller 23A on the transmitter side of the transmission line.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step. Likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions, and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety for all purposes; and all appropriate combinations of embodiments, features, characterizations, and methods from these references and the present disclosure may be included in embodiments of this invention. Still further, the components and steps identified in the Background section are integral to this disclosure and can be used in conjunction with or substituted for components and steps described elsewhere in the disclosure within the scope of the invention. In method claims (or where methods are elsewhere recited), where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A power-distribution system for regulating transfer of energy from a source on a transmitter side of a transmission line to a load on a receiver side of the transmission line, where a transmission-line electrical fault can be detected, and the source electrically isolated from the transmission line before substantial human or equipment damage is incurred, comprising:

a controller on the transmitter side of the power-distribution system responsive to one or more sensors that provide feedback to the controller, including providing at least a signal indicative of the voltage across the transmitter side of the transmission line;

a source-disconnect device operable by the controller, for electrically isolating the source from the transmission line; and a signal-generator circuit configured to superimpose a carrier waveform with a source-output waveform on the transmission line, where the carrier waveform has a frequency that is substantially higher than the source-output waveform frequency, wherein the controller includes a processor and computer-readable memory in communication with the processor, wherein the computer-readable memory stores software code to determine the normal impedance of the transmission line from measurement or by utilizing a preset held in the computer-readable memory, and for detecting a transmission-line fault, as indicated by a change in carrier waveform reflections or energy content of the carrier waveform because of a change in the normal impedance of the transmission line, and wherein the computer-readable memory further stores software code that generates a command to cause the controller to open the source-disconnect device upon detection of the fault on the transmission line.

2. The power-distribution system of claim 1, wherein the signal-generator circuit is a pulse generator producing a carrier frequency of at least 1,000 Hertz.

3. The power-distribution system of claim 1, further comprising inductors at both the transmitter side and receiver side, wherein the inductors are configured to filter the carrier waveform from the source-output waveform.

4. The power-distribution system of claim 3, further comprising an impedance-matching circuit on the receiver side of the transmission line, wherein the impedance-matching circuit is configured to provide a controlled impedance for the carrier waveform.

5. A method for regulating transfer of energy from a source on a transmitter side of a transition side of a transmission line to a load on a receiver side of the transmission line, comprising:

sensing voltage across the transmitter side of the transmission line;

superimposing a carrier waveform with a source-output waveform on the transmission line, wherein the carrier waveform has a frequency that is substantially higher than the source-output waveform frequency;

determining the normal impedance of the transmission line from measurement or by utilizing a preset;

detecting a transmission-line fault based on a change in carrier waveform reflections or energy content of the carrier waveform because of a change in the normal impedance of the transmission line; and electrically isolating the source from the transmission line upon detecting the transmission-line fault.

6. The method of claim 5, wherein the carrier waveform has a frequency of at least 1,000 Hertz.

7. The method of claim 5, further comprising using inductors at both the transmitter side and receiver side to filter the carrier waveform from the source-output waveform.

8. The method of claim 7, further comprising using an impedance-matching circuit on the receiver side of the transmission line to provide a controlled impedance for the carrier waveform.

* * * * *